UNITED STATES PATENT OFFICE.

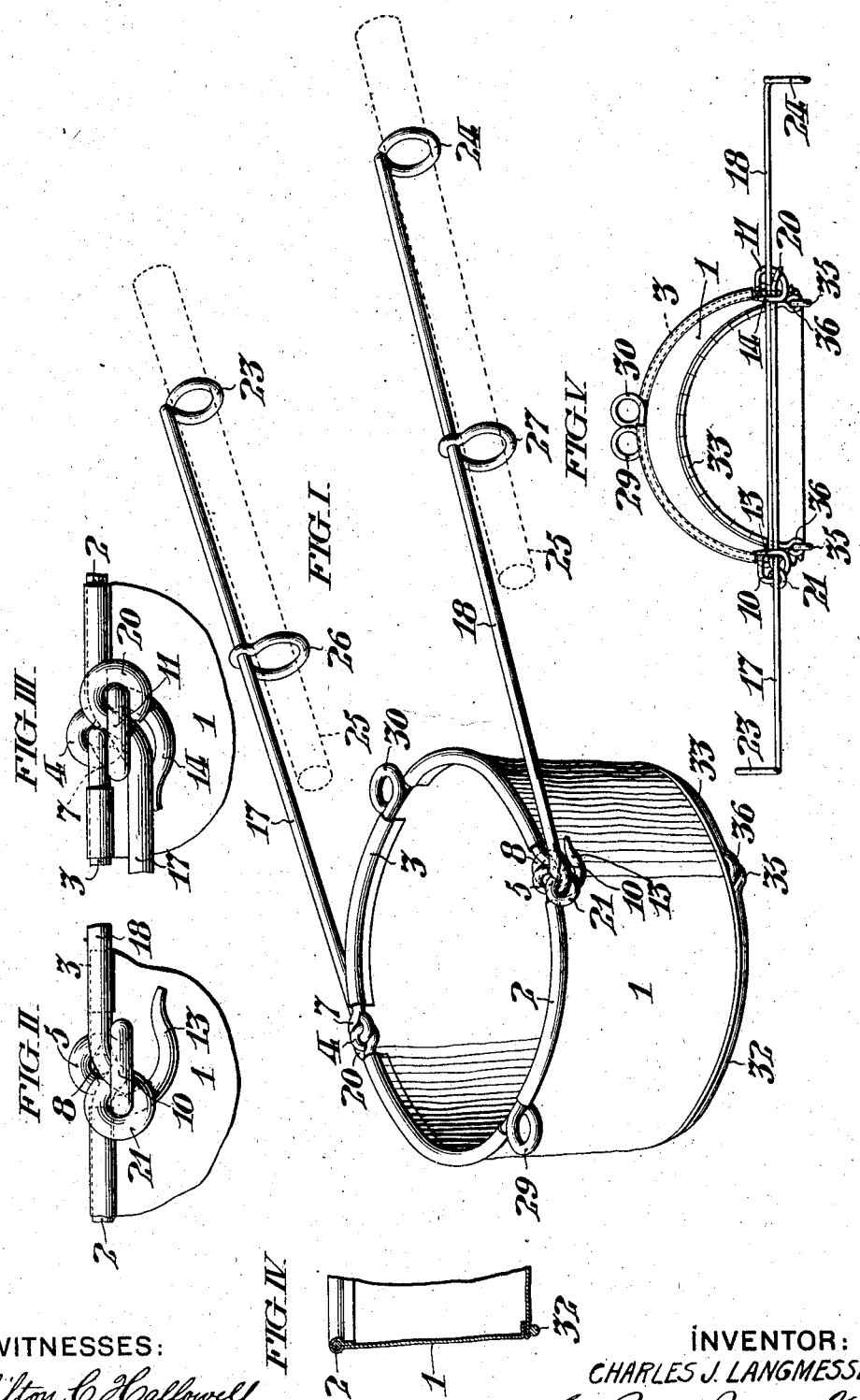

CHARLES J. LANGMESSER, OF PHILADELPHIA, PENNSYLVANIA.

FEED-BAG.

No. 796,229.        Specification of Letters Patent.        Patented Aug. 1, 1905.

Application filed April 12, 1905. Serial No. 255,161.

*To all whom it may concern:*

Be it known that I, CHARLES J. LANGMESSER, of Philadelphia, in the State of Pennsylvania, have invented certain new and useful Improvements in Feed-Bags, whereof the following is a specification, reference being had to the accompanying drawings.

My invention relates to feed-bags for horses and other draft-animals; and, as hereinafter described, my improvements comprise a bag of canvas or similar flexible material provided at its mouth with an annular frame arranged to hold the same distended when in use, said frame being composed of sections hingedly connected and arranged to be folded when the bag is collapsed and said frame being supported in use by rods extending to the thills of the vehicle to which the animal is harnessed.

In the form of my invention hereinafter described said annular frame comprises two semicircular sections which are hingedly connected at right angles to the direction of length of the thills, and the supporting-rods aforesaid are so connected with the hinged joints of said frame that the respective sections of the latter are held in horizontal position by said rods when the latter are held in horizontal position by the thills, and when it is desired to transport the device said rods are turned parallel with the axes of the hinged joints of said frame and the latter is collapsed and held in collapsed position by the engagement of said rods with hooks connected with said joints.

My invention comprises the various novel features of construction and arrangement hereinafter more definitely specified.

In the drawings, Figure I is a perspective view of a feed-bag embodying my improvements. Fig. II is an enlarged side elevation of the joint of the frame and rod nearest the observer in Fig. I. Fig. III is an enlarged side elevation of the joint of the frame and rod farthest from the observer in Fig. I. Fig. IV is a fragmentary vertical sectional view of the bag shown in Fig. I. Fig. V shows the device in collapsed position.

In said figures, 1 is the feed-bag, of canvas or similar flexible material, provided at its top with the frame comprising the semicircular sections 2 and 3. Said frame-section 2 is provided with the hinge-eyes 4 and 5, which are merely plain loops extending in vertical planes, as shown in detail in Figs. II and III. The other frame-section 3 is provided with eye-loops 7 and 8, extending transversely in engagement with said eye-loops 4 and 5 of the frame-section 2, so as to form hinged joints for said frame having their axes alined transversely with reference to the animal. The metal bar forming said eyes 7 and 8 is extended to form the eyes 10 and 11, which extend in a horizontal plane, as indicated in Figs. II and III, and terminate in the vertically-disposed hooks 13 and 14, the use of which will be hereinafter described. Said bag 1 is conveniently supported by the rods 17 and 18, whose forward ends are respectively provided with eyes 20 and 21 in engagement with said eyes 10 and 11 on the frame-section 3. Said rods 17 and 18 are provided at their opposite ends with loops 23 and 24, which are arranged to slip over the vehicle-thills 25, and said rods respectively carry loose rings 26 and 27, which may be slid upon said rods 17 and 18 to engage the ends of the thills, as indicated in Fig. I, and prevent lateral displacement of the rods 17 and 18 with respect thereto.

It may be noted that in the operative position shown in Figs. I, II, and III the frame-section 3 is prevented from swinging downwardly by resting upon the rod 17, which extends beneath its eye 7, as shown in Fig. III, and the frame-section 2 is prevented from swinging downwardly by having its eyes 4 and 5 engaged with the eyes 7 and 8 and supported by the eyes 10 11 on said frame-section 3. Said frame-sections 2 3 may be folded upwardly upon their hinged joints aforesaid and may be locked in folded position by the respective loops 29 and 30, which snap past each other into the position shown in Fig. V, but may be manually released when desired. With the frame folded, as shown in Fig. V, the rods 17 and 18 may be laid at right angles to their normal operative position in engagement with the respective hooks 13 and 14, said rods being turned with their end loops 23 and 24 in opposite directions, as indicated, in order to effect such engagement. It is to be understood that said hooks 13 and 14 are so shaped as to retain said rods against accidental displacement, but are resilient, so that said rods may be manually withdrawn from the folded position shown in Fig. V. I find it convenient to also provide the bottom of the bag with a stiffening-ring conveniently secured thereto by transverse stitches, as indicated by the cross-lines in Fig. V, and comprising two semicircular sections 32 and 33, the former being provided with vertically-extending eyes 35, engaged with the horizontally-extending eyes 36 on the section 33, as shown in Figs. I and V. As indicated in Fig. V, said ring-sections are secured in folded position by the rods 17 and 18 laid across them.

Although I find it convenient to employ the retaining-rings 26 and 27 on the rods 17 and 18 to engage the thills 25 and the ring comprising the hinged sections 32 and 33 on the bottom of the bag 1 to distend the latter, it is to be understood that either or both of said devices may be omitted.

I do not desire to limit myself to the precise details of construction and arrangement herein described, as various modifications may be made therein without departing from the essential features of my invention.

I claim—

1. In a feed-bag, the combination with a bag of flexible material; of a frame secured at the mouth of said bag comprising opposite sections hingedly connected at the sides of the bag; rods pivoted to one of the frame-sections and provided at their free ends with means arranged to engage the thills of a vehicle, substantially as set forth.

2. In a feed-bag, the combination with a bag of flexible material; of a frame secured at the mouth of said bag comprising opposite sections hingedly connected at the sides of the bag; rods pivoted to one of the frame-sections and provided at their free ends with means arranged to engage the thills of a vehicle; and a ring at the bottom of said bag comprising opposite sections hinged together in a plane parallel with the plane of the hinges of said frame, substantially as set forth.

3. In a feed-bag, the combination with a bag of flexible material; of a frame secured at the mouth of said bag comprising opposite sections hingedly connected at the sides of the bag; rods pivoted to one of the frame-sections and provided at their free ends with means arranged to engage the thills of a vehicle; and hooks extending from said hinge-joints arranged to lock said rods in folded position, substantially as set forth.

4. In a feed-bag, the combination with a bag of flexible material; of a frame secured at the mouth of said bag comprising opposite sections hingedly connected at the sides of the bag; rods pivoted to one of the frame-sections and provided at their free ends with means arranged to engage the thills of a vehicle; hooks extending from said hinge-joints arranged to lock said rods in folded position; and loops on the opposite frame-sections arranged to interengage when said sections are folded together, substantially as set forth.

5. In a feed-bag, the combination with a bag of flexible material; of a frame secured to the mouth of said bag, comprising opposite sections having hinge-loops connected at the opposite sides of the bag; loops extending laterally from one of said sections; hooks extending vertically from one of said sections; supporting-rods pivotally connected to said laterally-extending loops, and arranged to be locked in folded position by said hooks; thill-engaging loops in rigid relation with the free ends of said rods; retaining-rings in slidable relation with the respective rods, substantially as set forth.

6. In a feed-bag, the combination with a bag of flexible material; of a frame secured to the mouth of said bag, comprising opposite sections having hinge-loops connected at the opposite sides of the bag; loops extending laterally from one of said sections; hooks extending vertically from one of said sections; supporting-rods pivotally connected to said laterally-extending loops and arranged to be locked in folded position by said hooks; thill-engaging loops in rigid relation with the free ends of said rods; retaining-rings in slidable relation with the respective rods; and loops on the opposite frame-sections arranged to interengage when said sections are folded together, substantially as set forth.

7. In a feed-bag, the combination with a bag of flexible material; of a frame secured to the mouth of said bag, comprising opposite sections having hinge-loops connected at the opposite sides of the bag; loops extending laterally from one of said sections; hooks extending vertically from one of said sections; supporting-rods pivotally connected to said laterally-extending loops and arranged to be locked in folded position by said hooks; thill-engaging loops in rigid relation with the free ends of said rods; engaging rings in slidable relation with the respective rods; loops on the opposite frame-sections arranged to interengage when said sections are folded together; and a ring at the bottom of said bag comprising opposite sections hinged together in a plane parallel with the plane of the hinges of said frame, substantially as set forth.

In testimony whereof I have hereunto signed my name, at Philadelphia, Pennsylvania, this 10th day of April, 1905.

CHARLES J. LANGMESSER.

Witnesses:
   ARTHUR E. PAIGE,
   CLIFTON C. HALLOWELL.